US012800554B2

(12) United States Patent
Recoquillay

(10) Patent No.: US 12,800,554 B2
(45) Date of Patent: Nov. 17, 2026

(54) METHOD FOR AUTOMATICALLY IDENTIFYING AN ACOUSTIC SOURCE FROM A PRODUCED ACOUSTIC SIGNAL

(71) Applicant: Commissariat à l'Energie Atomique et aux Energies Alternatives, Paris (FR)

(72) Inventor: Arnaud Recoquillay, Gif-sur-Yvette Cedex (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 498 days.

(21) Appl. No.: 18/344,360

(22) Filed: Jun. 29, 2023

(65) Prior Publication Data

US 2024/0003854 A1 Jan. 4, 2024

(30) Foreign Application Priority Data

Jun. 30, 2022 (FR) ..................................... 22 06583

(51) Int. Cl.
*G01N 29/44* (2006.01)
*G01N 29/46* (2006.01)

(52) U.S. Cl.
CPC ....... *G01N 29/4445* (2013.01); *G01N 29/449* (2013.01); *G01N 29/46* (2013.01); *G01N 29/4481* (2013.01)

(58) Field of Classification Search
None
See application file for complete search history.

(56) References Cited

U.S. PATENT DOCUMENTS

2019/0033263 A1* 1/2019 Giurgiutiu ......... G01N 29/4454
2021/0156759 A1* 5/2021 Donskoy .............. B23K 31/125

FOREIGN PATENT DOCUMENTS

RU 2 737 235 C1 11/2020

OTHER PUBLICATIONS

French Preliminary Search Report issued Mar. 23, 2023 in French Application 22 06583 filed on Jun. 30, 2022, 9 pages (with English Translation of Categories of Cited Documents and Written Opinion).

(Continued)

*Primary Examiner* — Matthew G Marini
(74) *Attorney, Agent, or Firm* — Oblon, McClelland, Maier & Neustadt, L.L.P.

(57) ABSTRACT

This method comprises:

- a step of reconstructing the acoustic signal produced during the occurrence or the evolution of the defect, this reconstruction step comprising constructing an estimate $S_e(w)$ of the signal produced at the position of the defect based on an ultrasonic signal $F_j(t)$ measured by a sensor and using an estimate or a measurement of a product $R_j(w)G_j(w)$ that relates, in the frequency domain, the measured ultrasonic signal $F_j(w)$ to the produced acoustic signal $S(w)$, and
- a step of automatically classifying the acoustic source, carried out based on the estimate of the reconstructed acoustic signal.

11 Claims, 2 Drawing Sheets

(56) References Cited

OTHER PUBLICATIONS

Sabra et al., "Blind deconvolution in ocean waveguides using artificial time reversal" The Journal of the Acoustical Society of America, vol. 116, No. 1, 2004, pp. 262-271.
Farova et al., "Experimental Signal Deconvolution in Acoustic Emission Identification Setup" $6^{th}$ International Workshop NDT in Progress, 2011, pp. 33-40.
Zhang et al., "Evaluation of acoustic emission source localization accuracy in concrete structures" Structural Health Monitoring, vol. 19(6), 2020, pp. 2063-2074.
Sawan et al., "Unsupervised learning for classification of acoustic emission events from tensile and bending experiments with open-hole carbon fiber composite samples" Composites Science and Technology, 107, 2015, pp. 89-97.
Peeters, A large set of audio features for sound description (similarity and classification) in the Cuidado project version 1.0, 2004, 25 pages.
Pearson et al., "Improved acoustic emission source location during fatigue and impact events in metallic and composite structures" Structural Health Monitoring, vol. 16(4), 2017, pp. 382-399.
Pashmforoush et al., "Damage Characterization of Glass/Epoxy Composite Under Three-Point Bending Test Using Acoustic Emission Technique" Journal of Materials Engineering and Performance vol. 21(7), 2012, pp. 1380-1390.
Morizet et al., "Classification of acoustic emission signals using wavelets and Random Forests : Application to localized corrosion" Mechanical Systems and Signal Processing 70-71, 2016, pp. 1026-1037.
Michaels, "Deterministic Source Inversion for Wave Propagation Problems in Nondestructive Testing" Department of Theoretical and Applied Mechanics, Cornell University, 1981, 12 pages.
Martinez-Jequier et al., "Real-time damage mechanisms assessment in CFRP samples via acoustic emission Lamb wave modal analysis" Composites: Part B 68, 2015, pp. 317-326.

* cited by examiner

METHOD FOR AUTOMATICALLY IDENTIFYING AN ACOUSTIC SOURCE FROM A PRODUCED ACOUSTIC SIGNAL

The invention relates to a method and a device for automatically identifying an acoustic source from an acoustic signal produced by the occurrence or the evolution of a defect in a structure. The invention also relates to an information recording medium for implementing this method.

Such identification methods are used to identify the type of defect that has occurred in a structure. Indeed, in an industrial structure, acoustic sources may be varied (falling of an object, cracking, corrosion, breakup of material, friction, etc.). Depending on the purpose of the method or of the identification device, this will be calibrated so as to be sensitive only to certain events. The temporal distribution of these events makes it possible to monitor the state of health of the structure. However, this calibration may be rough, or multiple different events may be of interest, for example various types of damage such as fibre breakage or matrix cracking in the case of a composite. This is why individually monitoring events of each type may provide significantly finer information for supervision (for example, triggering an alert when fibre breakage occurs, but not for matrix cracking, or eliminating interfering signals).

For example, the structure to be inspected is a fibre-reinforced plastic sheet or the like. In this case, the acoustic source to be identified is the type of defect that has occurred or that is evolving. In this text, the expression "type of defect" denotes the physical nature of the defect. For example, in the case of structures consisting of a fibre-reinforced plastic matrix, there are primarily four types of defects, namely:

fibre breakages,
delamination,
breakup of the fibre matrix, and
cracking of the matrix.

These methods are therefore used in the field of non-destructive testing or SHM ("structural health monitoring").

Known methods for identifying an acoustic source from the acoustic signal produced by the occurrence or the evolution of a defect in the structure comprise the following steps:

- fitting out the structure with one or more sensors capable of measuring ultrasonic signals,
- measuring ultrasonic signals caused by the occurrence or the evolution of the defect, and then
- extracting certain physical characteristics of the measured ultrasonic signals, and then
- automatically classifying the acoustic source into a class from among multiple possible classes based on the extracted physical characteristics.

Examples of such known methods are described in the following articles:

1) Pashmforoush, F. et al.: "*Damage characterization of glass/epoxy composite under three-point bending test using acoustic emission technique*", Journal of materials engineering and performance, vol. 21(7), pp. 1380-1390, 2012,
2) Morizet, N. et al.: "Classification of acoustic emission signals using wavelets and Random Forests: Application to localized corrosion", Mechanical Systems and Signal Processing, 70, 1026-1037, 2016
3) Hisham A Sawan et al.: "*Unsupervised learning for classification of acoustic emission events from tensile and bending experiments with open-hole carbon fiber composite samples*", Composites Science and Technology, Volume 107, 2015, Pages 89-97,
4) Farova Zuzana et al.: "Experimental Signal Deconvolution in Acoustic Emission Identification Setup", 6th International Workshop NDT in Progress 201, 12 Oct. 2011, pages 33-40.

The articles numbered 1) to 3) above are respectively denoted in this text by the following references: Pashmforoush2012, Morizet2016 and Sawan2015.

The article numbered 4) requires the time reversal of signals measured by sensors fastened to the structure before reinjecting them into the structure so as to ultimately measure the reinjected signals using an additional sensor situated at the location where the defect that generated the measured signals has arisen. Using this additional sensor situated at the location where the defect has arisen makes this identification method difficult or even impossible to implement. For example, when the defect occurs inside the structure, it is not possible to place the additional sensor at the location of this defect, or if the emission areas are expansive, this method would have to be fitted out in a highly challenging manner.

One such known method is also described in application RU2737235C1. It is emphasized that the method described in application RU2737235C1 additionally comprises a step of locating the position of the acoustic source before carrying out the classification. In that method, the position of the acoustic source is used to determine the distance separating each sensor from the acoustic source. Next, the type of defect is identified from a ratio between the amplitude of certain frequency components of the ultrasonic signal measured by a sensor and the distance separating this sensor from the acoustic source.

These known identification methods in particular have the advantage that it is not necessary to equip the structure with an electronic emitter emitting waves such as ultrasonic waves. Indeed, it is the ultrasonic wave generated by the defect itself that is used to carry out this identification.

The known identification methods work correctly for small structures. On the contrary, these methods do not work as well with large structures in which the distance between the acoustic source and the sensors may be far greater. Indeed, the identification is carried out by way of parameters of the signals, but these parameters are greatly impacted by the propagation of the wave in the structure, this effect possibly being predominant over variations resulting from the physical nature of the source. Thus, the classification process in practice risks discriminating the propagation distance rather than the physical nature, which distance may vary due to the use of multiple sensors and sources located randomly on the structure in practice. In this regard, it will be recalled that the location of the defect is not known a priori.

The invention aims to propose a method for identifying an acoustic source that exhibits the same advantages as the known methods while at the same time working just as well with small structures as it does with large structures.

One subject of the invention is therefore an identification method.

Another subject of the invention is an information recording medium, able to be read by a microprocessor, wherein this medium comprises non-transitory instructions for the execution of steps b) to d) of the claimed identification method when these instructions are executed by the microprocessor.

Another subject of the invention is a device for automatically identifying an acoustic source that implements the above identification method.

The invention will be better understood on reading the following description, which is given merely by way of non-limiting example, with reference to the drawings, in which.

In these figures, the same references have been used to designate elements that are the same. In the remainder of this description, features and functions that are well known to those skilled in the art are not described in detail.

Section I: Exemplary Embodiments

Figure 1:
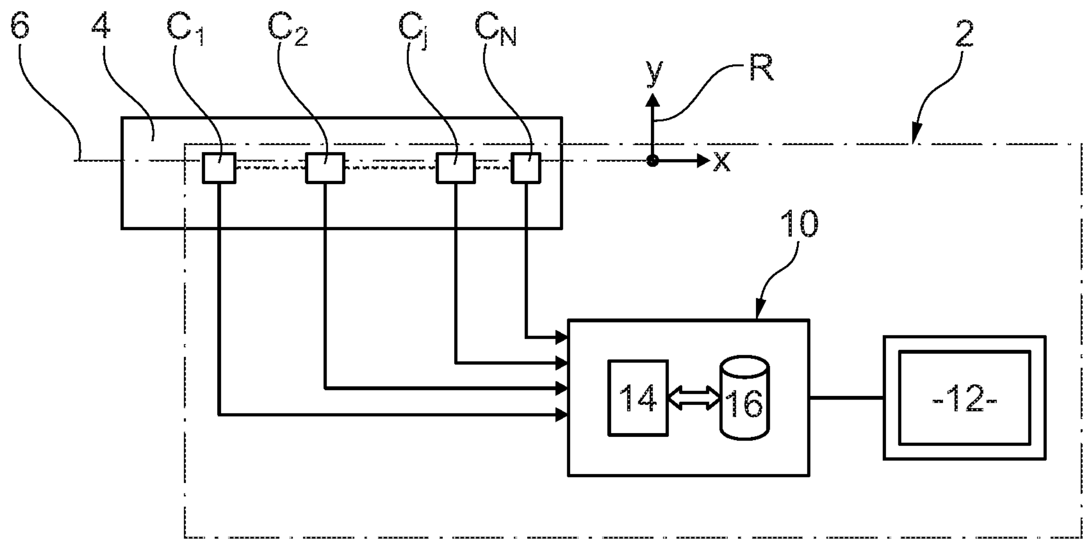
FIG. 1 is a schematic illustration of the architecture of a device for automatically identifying an acoustic source.

FIG. 1 shows a device 2 for automatically identifying an acoustic source from an acoustic signal produced by the occurrence or the evolution of a defect in a structure 4. In this case, the acoustic source is the defect that has occurred or that is evolving.

In this first embodiment, the structure 4 may be any structure in which, when a defect occurs or evolves, an acoustic signal S(t) is generated by this defect. The majority of the power of the signal S(t) is generally situated in the ultrasonic frequency band, that is to say in a frequency band ranging from 16 kHz to 10 MHz. In general, the power spectrum of the signal S(t) covers only part of the ultrasonic frequency band.

The structure 4 is made of a material that allows this signal S(t) to propagate inside this structure over a distance sufficient to be able to be measured by a sensor and distinguished from background noise.

By way of illustration, here, the structure 4 is a tube made of composite material formed of a fibre-reinforced plastic matrix. This tube extends along an axis 6 of revolution over a distance of 2 metres. Its cross section is constant and circular over its entire length.

A reference frame R is attached, without any degree of freedom, to the structure 4. The position of each point of the structure 4 is referenced by coordinates in the reference frame R. Here, the reference frame R comprises an axis X coincident with the axis 6 of revolution and an axis Y perpendicular to the axis X. For example, the axis Y is vertical and the axis X is horizontal.

Hereinafter, given that, in the specific case described here, the structure 4 is invariant to any rotation about the axis 6, the position of each point P of the structure 4 is defined by cylindrical coordinates ($x_p$, $\theta_p$), where:

- $x_p$ represents the abscissa of this point along the axis X of the reference frame R, and
- $\theta_p$ is the angle between a vector $O_kP$ and a direction parallel to the axis Y, where the vector $O_kP$ is the vector perpendicular to the axis 6 that extends from the point $O_k$ situated on the axis 6 to the point P of the structure 4.

The device 2 comprises:

- an electronic computer 10,
- a human/machine interface 12 connected to the computer 10, and
- N sensors $C_1$ to $C_N$ connected to the computer 10.

The computer 10 comprises a programmable microprocessor 14 and a memory 16. The memory 16 comprises the instructions and the data needed to execute the method of FIG. 2 or FIG. 4 when these instructions are executed by the microprocessor 14.

Figure 2:
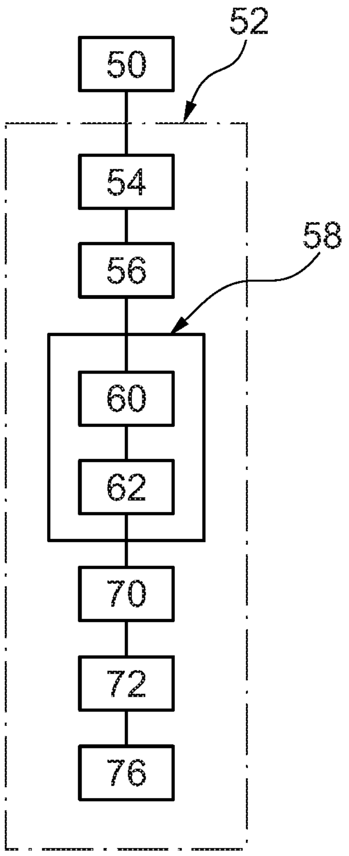
FIG. 2 is a flowchart of a method for automatically identifying an acoustic source using the device of FIG. 1.
Figure 4:
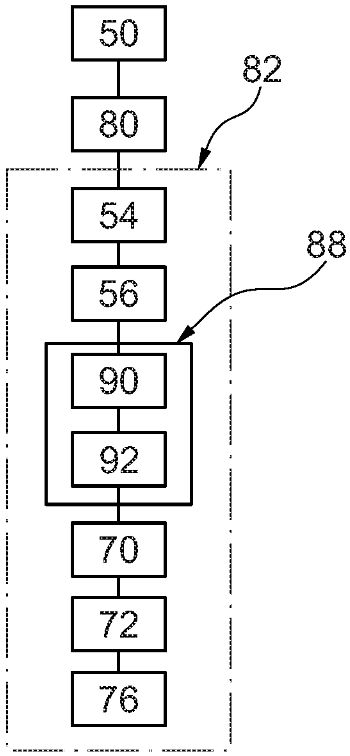
FIG. 4 is a flowchart of another identification method able to be implemented by the device of FIG. 1.

The human/machine interface 12 is capable of communicating, in a manner directly intelligible to a human being, the results of the implementation of the identification method of FIG. 2 or 4. For example, the interface 12 comprises a screen.

Each sensor $C_j$ measures the ultrasonic signal produced by the occurrence or the evolution of a defect in the structure 4. In this text, the index j is an integer between 1 and N that identifies the sensor $C_j$. The computer 10 acquires the measurements from each sensor $C_j$ in order to process them.

The device 2 comprises at least three sensors $C_j$ and, more often than not, at least four or six or eight sensors $C_j$. Here, by way of illustration, the total number N of sensors $C_j$ is equal to eight. Only the sensors $C_1$, $C_2$, $C_j$ and $C_N$ are shown in FIG. 1. The depiction of the other sensors has been replaced with dashed lines to simplify FIG. 1.

Here, the sensors $C_j$ are all structurally identical to one another and differ from one another only in terms of their positions in the reference frame R. For example, the sensors $C_j$ are piezoelectric sensors whose bandwidth covers at least the [100 kHz; 500 kHz] band, and preferably the [50 kHz; 0.5 MHz] or [20 kHz; 0.5 MHz] band.

Each sensor $C_j$ is fastened to the structure 4 at a respective location $P_j$ where it is capable of measuring an ultrasonic signal propagating in the structure 4. The coordinates ($x_j$; $\theta_j$) of each location $P_j$ are known and stored in the memory 16.

The sampling frequency $f_e$ of the measurements performed by the sensors $C_j$ is high, that is to say typically greater than 1 MHz.

Here, by way of illustration, the locations $P_j$ are distributed uniformly along an axis parallel to the axis 6. However, other distributions of the locations $P_j$ on the surface of the structure 4 are possible. For example, a plurality of the locations $P_j$ may also be distributed along the circular circumference of the structure 4. Preferably, the distance between any one of the locations $P_j$ and the closest location $P_{j+1}$ is computed so as to ensure good coverage of the structure, specifically that at least two sensors are able to measure a significant signal for a source at any point of the structure.

The operation of the device 2 will now be described with reference to the method of FIG. 2.

In a fitting-out step 50, the sensors $C_j$ are each fastened to a respective location P1 on the structure 4. The coordinates ($x_j$; $\theta_j$) of each position $P_j$ are recorded in the memory 16 in association with the identifier j of the sensor $C_j$.

A phase 52 then starts of using the device 2 to detect and identify an acoustic source.

In a step 54, each sensor $C_j$ measures the ultrasonic signal $F_j(t)$ propagating in the structure 4. Typically, the recording and the processing of the signal by each sensor is triggered by the detection of a wave by this sensor, for example by the ultrasonic signal $F_j(t)$ passing above a threshold. The recording stops when the wave is no longer detected, for example when the ultrasonic signal is below the threshold for a significant duration that is determined beforehand. The threshold and the significant duration recorded after the first detection of the wave are therefore chosen so as not to lose information. The recorded duration is typically of the order of a millisecond.

By contrast, the significant duration after the last detection is short enough and the threshold is high enough for, in the vast majority of cases, a single defect to occur or evolve during the recording and noise not to trigger the recording.

For example, for this purpose, the significant duration after the last detection is generally of the order of a few hundred µs.

At the same time, in step 54, the measurements from the sensors $C_j$ are acquired by the computer 10 at the sampling frequency $f_e$. The frequency $f_e$ is high enough to make it possible to acquire the measured signals $F_j(t)$ while avoiding or eliminating aliasing phenomena. For example, here, the frequency $f_e$ is greater than 1 MHz. Advantageously, the frequency $f_e$ is twice as great as the upper bound of the bandwidth of the sensors $C_j$.

The signal $F_j(t)$ measured by each sensor $C_j$ is related, in the frequency domain, to the signal S(t) generated by the defect by the following relationship: $F_j(w)=R_j(w)G_j(w)S(w)$, where:

- j is an index identifying the sensor $C_j$,
- w is the angular frequency in radians,
- $F_j(w)$ is the Fourier transform of the ultrasonic signal $F_j(t)$ measured in the time domain by the sensor $C_j$,
- S(w) is the Fourier transform of the acoustic signal S(t) produced by the occurrence or the evolution of the defect in the structure,
- $R_j(w)$ is the response, in the frequency domain, of the sensor $C_j$,
- $G_j(W)$ is the propagation function, in the frequency domain, of the acoustic signal in the structure between the position $P_s$ where the defect occurs and the location $P_j$ of the sensor $C_j$.

Once the signals $F_j(t)$ have been acquired, in a step 56, the computer 10 locates the position $P_s$ of the defect that generated the ultrasonic signals acquired by the sensors $C_j$. This locating consists in determining the coordinates $(x_s; \theta_s)$ of the position $P_s$ in the reference frame R from the measured and acquired signals $F_j(t)$ and the known coordinates of the locations $P_j$. In addition, here, the speed c at which the signal S(t) propagates in the structure 4 is also determined in step 56. For example, here, to determine the coordinates $(x_s; \theta_s)$ and the speed c, the triangulation method described in the following article is implemented: Zhang, F. et al.: "Evaluation of acoustic emission source localization accuracy in concrete structures", Structural Health Monitoring, vol. 19(6), pages 2063-2074, 2020.

More specifically, the times of arrival $t_j$ of the signal S(t) at each location $P_j$ are derived from the acquired ultrasonic signals $F_j(t)$. For example, the time t1 corresponds to the first time at which the amplitude of the signal $F_j(t)$ exceeds a predetermined threshold.

Next, the position $P_s$ and the speed c are taken to be equal to the position and the speed that minimizes the following cost function $J(P_s; c)$:

$$J(P_s, c) = \sum_{i=1}^{N-1} \sum_{j=i+1}^{N} (\|P_s - P_i\| - \|P_s - P_j\| - c(t_i - t_j))^2$$

For this purpose, an algorithm for minimizing the cost function $J(P_s; c)$ is implemented. For example, this may be an algorithm such as Newton's algorithm or the simplex algorithm. Genetic algorithms may also be implemented.

Once the locating of the acoustic source is complete, in a reconstruction step 58, the computer 10 constructs an estimate $S_e(w)$ of the signal S(w) produced at the position $P_s$ by the defect. This step aims to compensate for the propagation of the signal S(t) between the position $P_s$ and the locations $P_j$. To this end, in this first embodiment, the computer 10 uses the signals $F_j(t)$, the position $P_s$ and the speed c that are determined in step 56.

More specifically, in this first embodiment, what is called a "blind" reconstruction method is implemented. This method is said to be "blind" because it does not require each propagation function $G_j(w)$ of the signal S(t) from the position $P_s$ to the position $P_j$ to be learned beforehand in a learning step. These methods are better known by the term "blind source deconvolution".

Here, the method implemented by the computer 10 is described in the following article: Sabra, K. G. et al.: "Blind deconvolution in ocean waveguides using artificial time reversal", The Journal of the Acoustical Society of America, vol. 116(1), pages 262-271, 2004. Below, this article is designated by the reference Sabra2004.

According to this method, in an operation 60, the computer 10 constructs an estimate $G_{e,j}(w)$ of each propagation function $G_j(w)$ of the signal S(t) from the position $P_s$ to the location $P_j$. Here, each propagation function $G_{e,j}(w)$ is a Green function. To this end, the estimate $G_{e,j}(w)$ of the function $G_j(w)$ is taken to be equal to the signal $F_j(t)$ normalized by the $L_2$ norm of all of the signals $F_j(t)$ and multiplied by an estimated phase Γ. More specifically, the estimate $G_{e,j}(w)$ is constructed using the following relationships:

$$G_{e,j}(w) = \frac{F_j(w)}{\sqrt{\sum_{a=1}^{N} F_a(w)^2}} e^{-i\Gamma}$$

where:

- i is the imaginary number such that $i^2=-1$,
- Γ is a phase defined by the following relationship:

$$\Gamma = \arg \sum_{j=1}^{N} W_j F_j(w)$$

where:

- "arg" is the function that returns the argument of a complex number, and
- $W_j$ are predefined weights.

In addition, here, to make the method of FIG. 2 independent of the characteristics and the physical properties of the structure 4, the weights $W_j$ are computed using the following relationship:

$$W_j = e^{\frac{-\|P_s - P_j\|}{c} w}$$

where:

- i is the imaginary number such that $i^2=-1$,
- $\|P_s-P_j\|$ is the distance separating the positions $P_s$ and $P_j$,
- c is the speed determined in step 56, and
- w is the angular frequency in radians.

Next, in an operation 62, the estimate $S_e(w)$ is constructed by backpropagating the signals $F_j(t)$ to the position $P_s$. To this end, here, each signal $F_j(t)$ is backpropagated to the position $P_s$. Backpropagating a signal $F_j(t)$ consists in multiplying the signal $F_j(w)$ by the conjugate of the complex propagation function. In other words, the signal $F_j(w)$ backpropagated to the position $P_s$ is given by the following relationship: $(R_j(w)G_{e,j}(w))^*F_j(w)$, where the symbol "( . . . )*" denotes the conjugate of the complex function $R_j(w)G_{e,j}(w)$ between parentheses.

The estimate $S_e(w)$ is therefore constructed from the terms $(R_j(w)G_{e,j}(w))^*F_j(w)$ and each term $(R_j(w)G_{e,j}(w))^*F_j(w)$ is the product of the conjugate of the function $R_j(w)G_{e,j}(w)$ and the function $F_j(w)$. Here, the estimate $S_e(w)$ is taken to be equal to the average of the N terms $(R_j(w)G_{e,j}(w))^*F_j(w)$. The estimate $S_e(w)$ is thus constructed using the following relationship:

$$S_e(w) = \frac{1}{N}\sum_{j=1}^{N}(R_j(w)G_{e,j}(w))^*F_j(w)$$

In addition, in this embodiment, for simplification, each function $R_j(w)$ is equal to one regardless of the value of the angular frequency w. The estimate $S_e(w)$ is thus simply constructed using the following relationship:

$$S_e(w) = \frac{1}{N}\sum_{j=1}^{N}(G_{e,j}(w))^*F_j(w)$$

Once the estimate $S_e(w)$ has been constructed, in this embodiment, in a step 70, the estimate $S_e(t)$ of the signal S(t) in the time domain is obtained, for example, by applying an inverse Fourier transformation to the estimate $S_e(w)$.

Next, in this embodiment, the computer 10 executes a dimensionality reduction step 72. Such a step is also known by the term "dimension reduction". Specifically, the estimates $S_e(w)$ and $S_e(t)$ are generally large, that is to say often composed of several tens of thousands or hundreds of thousands of samples. Step 72 is aimed at reducing the amount of information to be processed while still retaining the essential information that will allow reliable and robust identification of the defect.

In this embodiment, step 72 consists in extracting physical characteristics inherent to the signal S(t) from the estimates $S_e(w)$ and $S_e(t)$ constructed beforehand. For example, here, the procedure is as described in section 2.2 of the article Morizet2016, except that no energy in a band greater than 200 kHz is extracted.

Finally, a classification step 76 is executed by the computer 10. In this step 76, the computer 10 classifies the signal S(t) into a class chosen from among multiple possible classes based on the characteristics extracted in step 72. To this end, the computer 10 executes an automatic classification method. For example, here, the computer 10 executes a known unsupervised classification method. This known unsupervised classification method is for example an automatic classification method using a Gaussian mixture model, or the method known as the k-means method and described for example in the article Pashmforoush2012. Here, in order to implement this classification method, the number $N_k$ of classes has been determined beforehand. For example, for the structure 4, the number $N_k$ of classes was chosen to be equal to 3. The most appropriate number $N_k$ of classes was determined here by trialling multiple possible values for the number $N_k$ and then by computing, for each of these values of the number $N_k$, the value of the DB (Davies-Bouldin) index. The value of the number $N_k$ for which the value of the DB index is minimum was selected. This computing of the value of the DB index is described for example in section 3.2 of the article Pashmforoush2012. Each class is related to a physical nature of the defect that produced the classified acoustic signal. The identification method thus makes it possible not only to detect the occurrence or the evolution of a defect, but also to identify the physical nature of this defect.

That which has been described above is repeated for each new event measured by the sensors $C_j$.

Figure 3:
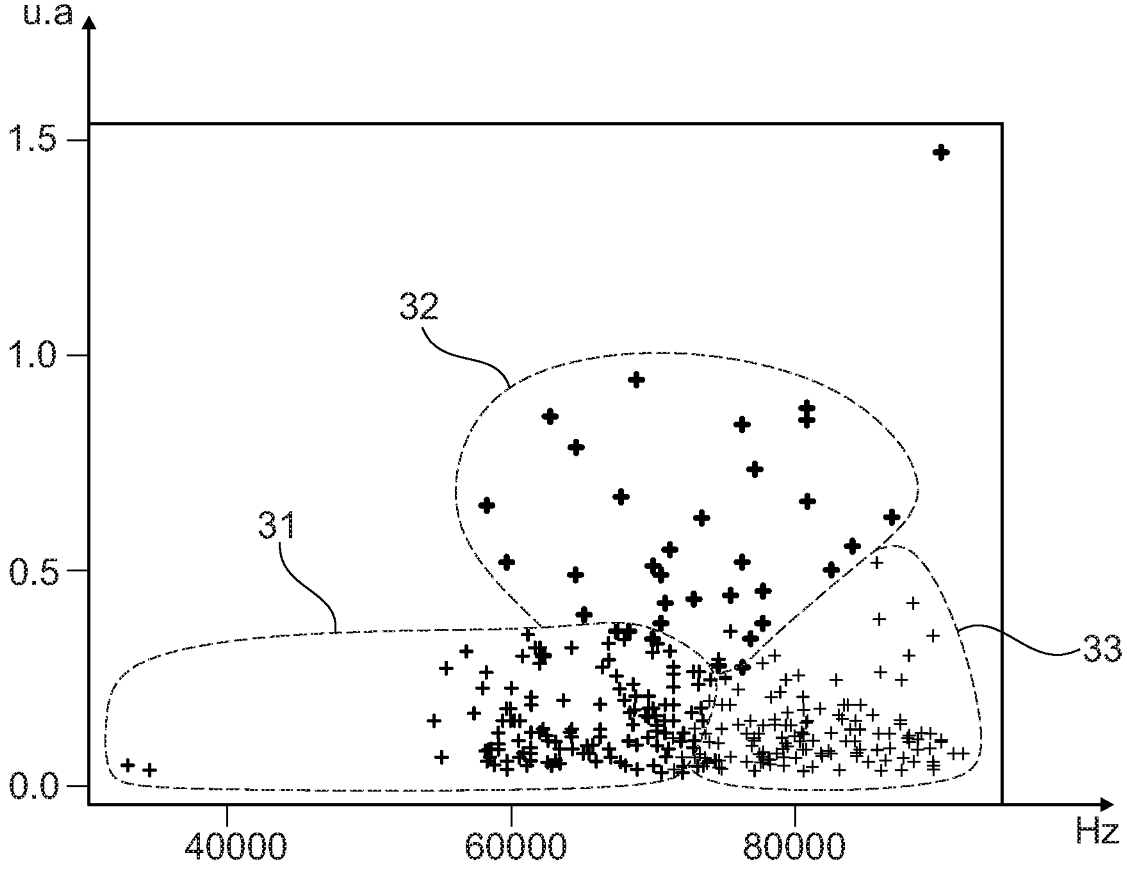
FIG. 3 is a graph illustrating the experimental results obtained by implementing the method of FIG. 2.

FIG. 3 illustrates, in the form of a graph, the results obtained by deforming the structure 4 repeatedly so as to make defects occur. In this figure, each point corresponds to an acoustic source and therefore to the occurrence or to the evolution of a defect in the structure 4. The ordinate axis is scaled in an arbitrary unit proportional to the amplitude of the signal $S_e(t)$, and the abscissa axis is in hertz. For each identified acoustic source, the amplitude of the estimate $S_e(t)$ and the frequency centroid of the estimate $S_e(w)$ were computed, and then this acoustic source was placed on the graph of FIG. 3 using the value of its frequency centroid as abscissa and the computed amplitude as ordinate. The frequency centroid is computed as described in section 6.1.1 of the following article: Geoffroy Peeters: "A large set of audio features for sound description (similarity and classification) in the CUIDADO project", 2004. The frequency centroid is expressed in hertz. Each acoustic source was classified into one of the three possible classes by implementing the method of FIG. 2. The graph of FIG. 3 comprises three areas 31, 32 and 33 that each surround the points classified into a respective class. The overlaps between these three areas 31, 32 and 33 are very small, thereby illustrating the fact that the classification that is carried out is robust.

FIG. 4 shows another identification method able to be implemented instead of the method of FIG. 2 by the computer 10. The method of FIG. 4 is identical to the method of FIG. 2 except that:

- a step 80 of learning each propagation function $G_j(w)$ is introduced between step 50 and the use phase, and
- the use phase 52 is replaced with a use phase 82.

In step 80, a broad-spectrum known acoustic signal $S_c(t)$ is applied to various locations $P_k$ of the structure 4. The signal $S_c(t)$ has a spectrum that covers the bandwidth of the structure 4, that is to say that includes all frequencies able to propagate and to be measured in the structure 4 without being excessively attenuated. For example, here, the spectrum of the signal $S_c(t)$ covers the ultrasonic frequency band. For example, in this embodiment, the signal $S_c(t)$ applied to each location $P_k$ is a Hsu-Nielsen source, that is to say an acoustic source produced by the snapping of pencil lead. Since this source is known, it is not described in any more detail.

The locations $P_k$ are uniformly distributed here over the surface of the structure 4. For example, the locations $P_k$ correspond to the vertices of a mesh covering the surface 4. Typically, the tiles of this mesh are identical or similar. The shortest distance between two contiguous locations $P_k$ is for example between 1 mm and 100 mm or between 3 mm and 20 mm. Here, the shortest distance between two contiguous locations $P_k$ is between 5 mm and 10 mm. The number $N_{pk}$ of locations $P_k$ is typically proportional to the surface area of the structure 4. For example, the number $N_{pk}$ is taken to be equal to the ratio $S_4/S_{ref}$, where:

- $S_4$ is the surface area of the structure 4, and
- $S_{ref}$ is a reference surface area, for example between $10^{-2}$ $m^2$ and 1 $m^2$.

The coordinates in the reference frame R of each location $P_k$ are known and stored in the memory 16.

Each time the signal $S_c(t)$ is applied to a location $P_k$, each sensor $C_j$ measures the ultrasonic signal $F_{j,k}(w)$ generated by the signal $S_c(t)$ propagating in the structure 4. The ultrasonic signal $F_{j,k}(w)$ is related to the acoustic signal $S_c(t)$ by the following relationship: $F_{j,k}(w)=R_j(w)G_{j,k}(w)S_c(w)$, where:

k is an index identifying the location $P_k$ whose coordinates are known, $F_{j,k}(w)$ is the Fourier transform of the ultrasonic signal $F_{j,k}(t)$ measured in the time domain by the sensor $C_j$ when the known acoustic signal $S_c(t)$ is applied to the location $P_k$, $S_c(w)$ is the Fourier transform of the known acoustic signal $S_c(t)$ applied to the location $P_k$, $R_j(w)$ is the response, in the frequency domain, of the sensor $C_j$, $G_{j,k}(w)$ is the propagation function, in the frequency domain, of the known acoustic signal $S_c(t)$ in the structure 4 between the location $P_k$ and the location of the sensor $C_j$.

Next, for each location $P_k$ where the signal $S_c(t)$ was applied, the product $R_j(W)G_{j,k}(W)$ of the functions $R_j(w)$ and $G_{j,k}(w)$ is recorded in the memory 16 in association with the identifier j of the sensor $C_j$ and the location $P_k$ where the signal $S_c(t)$ was applied. The product $R_j(w)G_{j,k}(w)$ is equal to the ratio $F_{j,k}(w)/S_c(w)$ of the ultrasonic signal $F_{j,k}(w)$ measured by the sensor $C_j$ and the known acoustic signal $S_c(w)$.

The phase 82 is identical to the use phase 52 except that the reconstruction step 58 is replaced with a reconstruction step 88. The reconstruction step 88 comprises:

an operation 90 of selecting, from the memory 16, the stored products $R_j(w)G_{j,k}(w)$, and an operation 92 of determining the estimate $S_e(w)$ of the signal S(w).

In the operation 90, the computer 10 selects the products $R_j(w)G_{j,k}(w)$ associated with the location $P_k$ closest to the position $P_s$ obtained at the end of the locating step 56.

In the operation 92, the estimate $S_e(w)$ is constructed only from the products $R_j(w)G_{j,k}(w)$ selected in the operation 90. More specifically, here, the estimate $S_e(w)$ is constructed from the terms $(R_j(w)G_{j,k}(w))^*F_j(w)$ in a manner similar to what was described in the case of the operation 62. For example, the estimate $S_e(w)$ is constructed using the following relationship:

$$S_e(w) = \frac{1}{N}\sum_{j=1}^{N}(R_j(w)G_{j,k}(w))^*F_j(w)$$

where the products $R_j(w)G_{j,k}(w)$ are those selected in the operation 90.

Section II: Variants

Variants of the "Blind" Reconstruction:

The values of the weights $W_j$ may be different. In particular, in one simplified embodiment, the values of the weights $W_j$ do not depend on the position $P_s$ of the defect. For example, the weights $W_j$ are constants all equal to +1. In this case, the locating step 56 may be omitted. In addition, when the locating of the defect is omitted, the number N of sensors $C_j$ may be fewer than three. For example, the number N of sensors $C_j$ is equal to two.

The values of the weights $W_j$ may also be determined on the basis of the physical characteristics of the structure 4, such as for example the theoretical dispersion of guided waves in the structure. In the latter case, the weights $W_j$ depend on the physical characteristics of the structure, such that the identification method is configured specifically to identify an acoustic signal in this structure.

As a variant, rather than using backpropagation of the signals measured by the sensors to obtain the estimate of the signal $S_e(w)$, it is possible to use inverse filtering, as described in the article Sabra2004. In the latter case, it is the terms $F_j(w)/(R_j(w)G_{e,j}(w))$ that are used to construct the estimate $S_e(w)$ rather than using the terms $(R_j(w)G_{e,j}(w))^*F_j(w)$. In this case, the estimate $S_e(w)$ is obtained using the following relationship:

$$S_e(w) = \frac{1}{N}\sum_{j=1}^{N}F_j(w)/(R_j(w)G_{e,j}(w))$$

In the latter case, the bandwidth of the estimate $S_e(w)$ is preferably limited so as to exclude highly attenuated frequencies, for example high frequencies attenuated by the structure 4. In other words, beyond a predetermined cutoff frequency $f_c$, the estimate $S_e(w)$ is zero. This makes it possible to limit the sensitivity of the estimate $S_e(w)$ to noise. Specifically, for frequencies greater than $f_c$, the product $R_j(w)G_{e,j}(w)$ is close to zero, such that noise is highly amplified beyond the frequency $f_c$ if the bandwidth of the estimate $S_e(w)$ is not limited.

The reconstruction step may be carried out using "blind" reconstruction methods other than the one described. Numerous examples of other "blind" reconstruction methods may be found in the field of blind source deconvolution.

The estimate $S_e(w)$ may also be constructed from a weighted sum of the terms $(R_j(w)G_{e,j}(w))^*F_j(w)$ or $F_j(w)/(R_j(w)G_{e,j}(w))$. For example, the estimate $S_e(w)$ is constructed using the following relationship:

$$S_e(w) = \sum_{j=1}^{N}q_j(R_j(w)G_{e,j}(w))^*F_j(w)$$

where $q_j$ is a weighting coefficient. The sum of the coefficients $q_j$ is equal to one. For example, the closer the sensor $C_j$ is to the position $P_s$, the larger the coefficient $q_j$, so as to give more weight to the measurements from the sensors closest to the defect. In a simplified case, only the coefficients $q_j$ of the M closest sensors $C_j$ are non-zero and the coefficients $q_j$ of the (N−M) remaining sensors $C_j$ are zero, where M is an integer less than N. For example, M is equal to one or two or three.

As a variant, the response $R_j(w)$ is not a constant equal to one, and the estimate $S_e(w)$ is constructed using the following relationship:

$$S_e(w) = \frac{1}{N}\sum_{j=1}^{N}(R_j(w)G_{e,j}(w))^*F_j(w)$$

To this end, if the impulse response of each sensor $C_j$ is known, then $R_j(w)$ may be constructed from this known impulse response. The response $R_j(w)$ of each sensor $C_j$ may thus be measured. In the latter cases, the response $R_j(w)$ is generally not a constant.

Learning-Based Reconstruction Variants:

The applied known acoustic signal may be generated by an acoustic source other than a Hsu-Nielsen source. For example, the known acoustic signal may also be generated by an electronic acoustic emitter.

In the learning step, as a variant, it is not the same known acoustic signal that is applied to each location $P_k$. In this case, the product stored in association with each location $P_k$ is obtained using the following relationship: $R_j(w)G_{j,k}(w)=F_{j,k}(w)/S_{c,k}(w)$, where $S_{c,k}(w)$ is the acoustic signal applied to the location $P_k$.

Like in the case of the "blind" reconstruction, the estimate $S_e(w)$ may also be constructed by inverse filtering. It may also be constructed from a weighted or unweighted sum of the terms $(R_j(w)G_{j,k}(w))^*F_j(w)$ or $F_j(w)/(R_j(w)G_{j,k}(w))$.

The data used in the learning step 80 may result from numerical simulations.

Variants Common to all Embodiments:

A step of preprocessing the ultrasonic signals $F_j(t)$ measured by the sensors $C_j$ may be carried out before the locating step and/or before the reconstruction step in order to carry out these steps on preprocessed ultrasonic signals and not on the raw ultrasonic signals delivered directly by the sensors. Examples of preprocessing operations that may be applied to the raw ultrasonic signals $F_j(t)$ are described for example in section 2.1 of the article Morizet2016.

Other embodiments of the locating step 56 are possible. For example, as a variant, the location of the position $P_s$ of the defect is obtained by implementing the method described in the following article: Pearson M. R. et al.: "*Improved acoustic emission source location during fatigue and impact events in metallic and composite structures*", Structural Health Monitoring, vol. 16(4), pages 382-399, 2017. In addition, that article also describes another method for deriving the times of arrival $t_j$.

If the speed c at which the signal S(t) propagates within the structure 4 is known, then it is not necessary to determine it in the locating step 56. For example, the known speed c is recorded beforehand in the memory 16.

When the estimate $S_e(w)$ is constructed from the terms $F_j(w)/(R_j(w)G_{e,j}(w))$ or $F_j(w)/(R_j(w)G_{j,k}(w))$, if the denominator of these fractions is close to zero within a frequency range, then this frequency range is excluded and is not taken into consideration in the classification step. Such a situation may be encountered for example when the structure greatly attenuates the propagation of waves at frequencies greater than $f_{max}$. For example, if the product $R_j(w)G_{e,j}(w)$ or $R_j(w)G_{j,k}(w)$ is less than 0.1 beyond the frequency $f_{max}$, then the estimate $S_e(w)$ is limited to the frequency range $[0; f_{max}]$. This makes it possible to work within the frequency range in which the signal-to-noise ratio is good and to exclude the frequency range where this signal-to-noise ratio is poor. This ultimately improves the robustness of the identification method.

Other embodiments of the dimensionality reduction step 72 are possible. For example, characteristics other than those cited in the article Morizet2016 may be used in addition to or instead of the characteristics cited in this article. It is also possible to use a smaller or a larger number of physical characteristics. It is also possible to reduce the amount of information to be processed in the classification step by methods other than the extraction of physical characteristics. For example, mathematical methods such as the principal component analysis method may be used to carry out the dimensionality reduction step. A brief description of this method may be found in section 3.1 of the article Pashmforoush2012.

The dimensionality reduction step may also be omitted. In this case, the number of samples of the signal $S_e(w)$ or $S_e(t)$ is not reduced before the classification step.

Classification methods other than those described above may be implemented to identify the acoustic source. For example, it is also possible to use the KGA ("K-means Genetic Algorithm") method, or the WPT ("Wavelet Packet Transform") method, both described in the article Pashmforoush2012. The expectation maximization method, known by the acronym EM ("expectation maximization algorithm"), or else the unsupervised classification methods described in the article Sawan2015 may also be used.

Supervised classification methods may also be implemented. For example, the "Random Forest" method described in the article Morizet2016 may be implemented. The following supervised classification methods may also be used: k-NN ("k-Nearest Neighbours"), SVM ("Support Vector Machine"), an artificial neural network and the like.

The classification may be carried out based on the estimate $S_e(w)$ alone. In this case, the step 70 of constructing the estimate $S_e(t)$ may be omitted. On the contrary, the classification may also be carried out just based on the signal $S_e(t)$.

Other Variants:

The structure is not necessarily a tube made of composite material. That which has been described here is applicable to other structures, such as for example:

sheets, for example made of metal or composite material, concrete structures, such as bridge piers.

The microprocessor 14 may be a generic processor, a specific processor, an application-specific integrated circuit (ASIC) or a field-programmable gate array (FPGA).

A plurality of the variants described here may be combined in one and the same embodiment.

Section III: Advantages of the Described Embodiments

Directly using the estimate of the acoustic signal S(t) produced at the position $P_s$ for the classification instead of the measured ultrasonic signals makes it possible to make the classification more robust and therefore to increase the reliability of the method for identifying the acoustic signal. In particular, this makes it possible to reduce the influence of distortions of the acoustic signal that occur when it propagates in the structure so as to reach the locations $P_j$ where it is measured by the sensors $C_j$. By virtue of this, the identification methods described here may be applied to any structure and, in particular, to large structures in which the acoustic signal travels a significant distance before reaching the sensors $C_j$.

Using the estimates $G_{e,j}(w)$ of the propagation functions $G_j(w)$ makes it possible to improve the robustness of the identification of the acoustic source without this requiring the execution of a learning step in which various functions $G_{j,k}(w)$ are measured for various possible positions $P_k$ of the defect and for a known acoustic signal. In addition, since the estimates $G_{e,j}(w)$ are constructed each time the signals $F_j(t)$ are measured, these estimates $G_{e,j}(w)$ follow and adapt automatically to the variations of the functions $G_j(w)$. Indeed, the functions $G_j(w)$ may vary over time, in particular depending on the state of the structure and the environmental conditions in which the structure is placed.

Using weights $W_j$ whose values depend on the distance separating the location $P_j$ and the position $P_s$ makes it possible to improve the precision of the estimate $S_e(w)$ and therefore to improve the reliability of the described method. In addition, in this case, the values of the weights $W_j$ are independent of the characteristics of the fitted-out structure. Thus, in this case, the identification method works with any type of structure, and not only with pipes or flat structures such as sheets.

The fact that the response, in the frequency domain, of each sensor is assimilated to a constant equal to one simplifies the implementation of the identification method.

The step of learning the products $R_j(w)G_{j,k}(w)$ makes it possible to construct a precise estimate of the signal $S_e(w)$ and therefore to obtain a robust identification method.

The invention claimed is:

1. A method for automatically identifying an acoustic source from an acoustic signal S(t) produced by an occurrence or an evolution of a physical defect in a physical structure, comprising:

(a) fitting out the physical structure by fastening at least one ultrasonic sensor to the physical structure, (b) using the at least one ultrasonic sensor to measure an ultrasonic signal $F_j(t)$ caused by the acoustic signal produced by the occurrence or the evolution of the defect in the physical structure, the measured ultrasonic signal being related, in a frequency domain, to the produced acoustic signal by the following relationship: $F_j(w)=R_j(w)G_j(w)S(w)$, where:

j is an index identifying the at least one ultrasonic sensor, w is an angular frequency in radians, $F_j(w)$ is a Fourier transform of the ultrasonic signal $F_j(t)$ measured in a time domain by the at least one ultrasonic sensor j, S(w) is a Fourier transform of the acoustic signal S(t) produced by the occurrence or the evolution of the physical defect in the physical structure, $R_j(w)$ is a response, in the frequency domain, of the at least one ultrasonic sensor j, $G_j(w)$ is a propagation function, in the frequency domain, of the acoustic signal in the physical structure between a position of the physical defect and a location of the at least one ultrasonic sensor j, and (c) automatically detecting the physical defect in the physical structure by classifying the acoustic source into a class of acoustic sources chosen from among multiple possible classes of acoustic sources, wherein:

the method further comprises, between (b) and (c), (d) reconstructing the acoustic signal produced during the occurrence or the evolution of the physical defect, the reconstructing comprising constructing an estimate $S_e(w)$ of the signal produced at the position of the physical defect based on the ultrasonic signal $F_j(t)$ measured by the at least one ultrasonic sensor and using an estimate or a measurement of a product $R_j(w)G_j(w)$ that relates, in the frequency domain, the measured ultrasonic signal $F_j(w)$ to the produced acoustic signal S(w), and the automatic classification is performed based on the estimate of the acoustic signal as obtained in the step (d).

2. The method according to claim 1, wherein:

the fitting-out comprises fastening at least three ultrasonic sensors to the structure at locations whose coordinates are known in a reference frame fixed with respect to the structure, the step (b) further comprises using each of the at least three ultrasonic sensors to measure a respective ultrasonic signal $F_j(t)$ caused by the acoustic signal produced by the occurrence or the evolution of the physical defect in the physical structure, each of the measured ultrasonic signals being related, in the frequency domain, to the produced acoustic signal by the following relationship: $F_j(w)=R_j(w)G_j(w)S(w)$, the method further comprises, between (b) and (d), locating, in the fixed reference frame, the position of the defect that produced the acoustic signal based on the measurements performed by the at least three ultrasonic sensors in the step (b) and on known coordinates of the at least three ultrasonic sensors in the fixed reference frame, and the step (d) further comprises obtaining the estimate or the measurement of the product $R_j(w)G_j(w)$ using the position of the physical defect as obtained in the locating.

3. The method according to claim 2, wherein the step (d) further comprises:

for each of the at least one ultrasonic sensor, constructing an estimate $G_{e,j}(w)$ of the propagation function $G_j(w)$ of the acoustic signal in the structure between the position where the defect occurs and the location of the at least one ultrasonic sensor, using the following relationship:

$$G_{e,j}(w) = \frac{F_j(w)}{\sqrt{\sum_{a=1}^{N} F_a(w)^2}} e^{-i\Gamma}$$

where Γ is a phase defined by the following relationship:

$$\Gamma = \arg\sum_{j=1}^{N} W_j F_j(w)$$

where "arg" is a function that returns an argument of a complex number, and $W_j$ are predefined weights, constructing the estimate $S_e(w)$ of the signal S(w) from $(R_j(w)G_{e,j}(w))^*F_j(w)$ or $F_j(w)/(R_j(w)G_{e,j}(w))$, where the symbol "( . . . )*" denotes a conjugate of the complex function between parentheses, and each weight $W_j$ is defined by the following relationship:

$$W_j = e^{\frac{-\|P_s-P_j\|}{c}w}$$

where $P_s$ are coordinates, in the fixed reference frame, of the physical defect as obtained in the locating, $P_j$ are coordinates, in the fixed reference frame, of the sensor j, c is a speed at which the acoustic signal propagates inside the physical structure, and w is an angular frequency in radians.

4. The method according to claim 2, wherein each function $R_j(w)$ is equal to one regardless of a value of the angular frequency w.

5. The method according to claim 2, further comprising:

learning the product $R_j(w)G_j(w)$ of the functions $R_j(w)$ and $G_j(w)$ for various possible locations of the physical defect, the learning comprising:

(i) for each of the at least one ultrasonic sensor, measuring or estimating, using numerical simulation, an ultrasonic signal $F_{j,k}(t)$ measured by the at least one ultrasonic sensor when a known acoustic signal $S_{c,k}(t)$ is applied to the structure at a location $P_k$ whose coordinates are known in the fixed reference frame, each of the ultrasonic signals $F_{j,k}(t)$ being related, in the frequency domain, to the known acoustic signal $S_{c,k}(t)$ by the following relationship: $F_{j,k}(w)=R_j(w)G_{j,k}(W)S_{c,k}(w)$, where:

k is an index identifying the location Pk whose coordinates are known, $F_{j,k}(w)$ is a Fourier transform of the ultrasonic signal $F_{j,k}(t)$ measured or estimated in the time domain by the sensor j when the known acoustic signal is applied to the location $P_k$, $S_{c,k}(w)$ is the Fourier transform of the known acoustic signal $S_{c,k}(t)$ applied to the location $P_k$, $R_j(w)$ is the response, in the frequency domain, of the at least one ultrasonic sensor j, and $G_{j,k}(w)$ is the propagation function, in the frequency domain, of the known acoustic signal $S_{c,k}(t)$ in the structure between the location $P_k$ and the location of the at least one ultrasonic sensor j, (ii) for each of the at least one ultrasonic sensor, storing, in association with the at least one ultrasonic sensor j and the coordinates of the location $P_k$, the product $R_j(w)G_{j,k}(w)$ of the functions $R_j(w)$ and $G_{j,k}(w)$, the product $R_j(w)G_{j,k}(w)$ being obtained using the following relationship: $R_j(w)G_{j,k}(w)=F_{j,k}(w)/S_{c,k}(w)$, (iii) repeating the steps (i) and (ii) for multiple possible locations $P_k$, (iv) selecting the products $R_j(w)G_{j,k}(w)$ stored in association with the location $P_k$ closest to the position of the physical defect as obtained at the end of the locating step, and (v) determining the estimate $S_e(w)$ of the signal S(w) from the terms $(R_j(w)G_{j,k}(w))^*F_j(w)$ or the terms $F_j(w)/(R_j(w)G_{j,k}(w))$, where the products $R_j(w)G_{j,k}(w)$ are those selected in the step (iv), and the symbol "( . . . )*" denotes a conjugate of the complex function between parentheses.

6. The method according to claim 1, wherein the step (d) further comprises:

for the at least one ultrasonic sensor, constructing an estimate $G_{e,j}(w)$ of the propagation function $G_j(w)$ of the acoustic signal in the structure between the position where the defect occurs and the location of the at least one ultrasonic sensor, using the following relationship:

$$G_{e,j}(w) = \frac{F_j(w)}{\sqrt{\sum_{a=1}^{N} F_a(w)^2}} e^{-i\Gamma}$$

where Γ is a phase defined by the following relationship:

$$\Gamma = \arg\sum_{j=1}^{N} W_j F_j(w)$$

where "arg" is a function that returns an argument of a complex number, and $W_j$ are predefined weights, and constructing the estimate $S_e(w)$ of the signal S(w) from $(R_j(w)G_{e,j}(w))^*F_j(w)$ or $F_j(w)/(R_j(w)G_{e,j}(w))$, where the symbol "( . . . )*" denotes a conjugate of the complex function between parentheses.

7. The method according to claim 6, wherein the estimation $G_{e,j}(w)$ of the propagation function $G_j(W)$ is a Green function.

8. The method according to claim 1, wherein:

the method further comprises constructing the estimate $S_e(t)$, in the time domain, of the acoustic signal S(t) by applying an inverse Fourier transformation to the estimate $S_e(w)$, and the automatic classification is performed based on the estimate $S_e(t)$ in the time domain.

9. The method according to claim 1, wherein the method further comprises a dimensionality reduction step in which physical characteristics inherent to the signal produced at the position of the defect are extracted from the estimate $S_e(w)$ constructed in the step (d), and, in the step (c), the automatic classification is performed based on the characteristics extracted in the dimensionality reduction step.

10. A non-transitory information recording medium, configured to be read by a microprocessor, wherein the medium comprises instructions for execution of the steps (b) to (d) of the identification method according to claim 1 when the instructions are executed by the microprocessor.

11. A device for automatically identifying an acoustic source from an acoustic signal S(t) produced by an occurrence or an evolution of a physical defect in a physical structure, the device comprising:

at least one ultrasonic sensor fastened to the physical structure, the at least one ultrasonic sensor being configured to measure an ultrasonic signal $F_j(t)$ caused by the acoustic signal produced by the occurrence or the evolution of the physical defect in the physical structure, the measured ultrasonic signal being related, in a frequency domain, to the produced acoustic signal by the following relationship: $F_j(w)=R_j(w)G_j(w)\ S(w)$, where:

j is an index identifying the at least one ultrasonic sensor, w is an angular frequency in radians, $F_j(w)$ is a Fourier transform of the ultrasonic signal $F_j(t)$ measured in a time domain by the at least one ultrasonic sensor j, S(w) is a Fourier transform of the acoustic signal S(t) produced by the occurrence or the evolution of the defect in the structure, $R_j(w)$ is a response, in the frequency domain, of the at least one ultrasonic sensor j, and $G_j(w)$ is a propagation function, in the frequency domain, of the acoustic signal in the physical structure between a position where the physical defect occurs and a location of the at least one ultrasonic sensor j, and processing circuitry configured to:

acquire the measurements from the at least one ultrasonic sensor, and automatically detect the physical defect in the physical structure by classifying the acoustic source into a class of acoustic sources chosen from among multiple possible classes of acoustic sources, wherein the processing circuitry is further configured to:

before the automatic classification, reconstruct the acoustic signal produced during the occurrence or the evolution of the physical defect, the reconstruction comprising constructing an estimate of the signal produced at the position of the physical defect based on the ultrasonic signal $F_j(t)$ measured by the at least one ultrasonic sensor and using an estimate or a measurement of the product $R_j(w)G_j(w)$ that relates, in the frequency domain, the measured ultrasonic signal $F_j(w)$ to the produced acoustic signal S(w), and perform the automatic classification based on the estimate of the acoustic signal as obtained in the reconstruction step.

* * * * *